United States Patent [19]
Leroux

[11] Patent Number: 5,588,146
[45] Date of Patent: Dec. 24, 1996

[54] METHOD FOR THE ACQUISITION OF SOFTWARE AND DATA-PROCESSING SYSTEM TO IMPLEMENT THE METHOD

[75] Inventor: Jean-Yves Leroux, Bouc Bel Air, France

[73] Assignee: Gemplus Card International, Gemenos, France

[21] Appl. No.: 140,661

[22] Filed: Oct. 21, 1993

[30] Foreign Application Priority Data

Oct. 23, 1992 [FR] France ................... 92 12702

[51] Int. Cl.$^6$ .............. G06F 17/30; G06F 12/14; G06F 15/163
[52] U.S. Cl. ............... 395/601; 395/200.09; 395/491; 395/228
[58] Field of Search ................ 395/200, 600, 395/650, 700, 725, 200.06, 200.09, 491, 726; 380/4, 25, 49; 364/401; 340/825.34, 825.31

[56] References Cited

U.S. PATENT DOCUMENTS

| | | | |
|---|---|---|---|
| 4,757,534 | 7/1988 | Matyas et al. | 380/25 |
| 4,763,191 | 8/1988 | Gordon et al. | 348/7 |
| 4,864,494 | 9/1989 | Kobus, Jr. | 395/186 |
| 4,891,785 | 1/1990 | Donohoo | 395/200.01 |
| 4,941,175 | 7/1990 | Enescu et al. | 380/4 |
| 4,949,257 | 8/1990 | Orbach | 364/401 |
| 5,010,571 | 4/1991 | Katznelson | 380/4 |
| 5,109,413 | 4/1992 | Comerford | 380/4 |
| 5,138,712 | 8/1992 | Corbin | 395/700 |
| 5,162,989 | 11/1992 | Matsuda | 364/401 |
| 5,293,424 | 3/1994 | Holtey et al. | 380/23 |
| 5,339,239 | 8/1994 | Manabe et al. | 364/401 |
| 5,343,524 | 9/1994 | Mu et al. | 380/4 |
| 5,388,211 | 2/1995 | Hornbuckle | 395/700 |

FOREIGN PATENT DOCUMENTS

| | | |
|---|---|---|
| 0421409 | 4/1991 | European Pat. Off. . |
| 0456920 | 11/1991 | European Pat. Off. . |

*Primary Examiner*—Thomas G. Black
*Assistant Examiner*—Jack M. Choules
*Attorney, Agent, or Firm*—Nilles & Nilles, S.C.

[57] ABSTRACT

Disclosed are a method and a data-processing system for the acquisition of software programs by a microcomputer. The system comprises, for this purpose, a data base service center in which application software programs are stored and a removable electronic memory carrier containing rights of access, to be introduced into a drive of the microcomputer to enable the remote-loading, into the microcomputer, of software programs for which the carrier contains the corresponding rights of access, this same carrier being capable of containing the rights to run the remote-loaded software. The disclosed device can be applied to portable microcomputers.

20 Claims, 1 Drawing Sheet

5,588,146

METHOD FOR THE ACQUISITION OF SOFTWARE AND DATA-PROCESSING SYSTEM TO IMPLEMENT THE METHOD

BACKGROUND OF THE INVENTION

1. Field of the Invention

The invention relates to a method of acquisition of software programs by microcomputers.

The invention also relates to a data-processing system for the acquisition of software.

The invention can be applied notably to microcomputers known as portable or pocket computers, i.e. computers that can easily be carried about and can work with independent power supplies (such as cells and batteries).

2. Description of the Prior Art

To obtain several hours of independent operation, it has been necessary to remove elements that consume a great deal of power from these microcomputers. In particular, the hard disk has been replaced by purely electronic memory and the magnetic disk drives have been replaced by drives for the reading of removable mass memories or mass memory cards. These memory cards are sometimes called PC-cards or again PCMCIA cards after the name of the corresponding standard ("Personal Computer Memory Card International Association" 1030B East Duane Avenue, Sunnyvale, Calif.). These cards have several memory chips and a connector at the end of a card (68-pin female connector) that can be plugged into a corresponding connector of the drive of the microcomputer. The connections are such that the memory can be addressed by a parallel input-output port of the microcomputer. These cards are compact: they have the format of a credit card with a thickness of 3 to 5 millimeters, and access to them is obtained very speedily. Finally, their total memory capacity may attain several tens of megabytes.

Besides, to protect a computer against use by an unauthorized person, certain microcomputers also have a drive for the reading of chip cards. The security system then consists in preventing the use of the microcomputer if the user has not furnished the appropriate confidential codes or if he has not inserted a chip card into this drive.

The distribution of application software programs to microcomputers is usually done by magnetic diskettes. In the case of these portable microcomputers which no longer have magnetic disk drives but PCMIA card drives, these card drives are used to carry out the distribution of the application software programs: a user purchases a PCMCIA card, into which an application software program has been loaded, from a vendor.

However, in practice, PCMCIA cards with mass storage units are very costly: they cost up to some thousands of francs depending on the memory capacity, thus making the cost of the smallest application software program prohibitive.

SUMMARY OF THE INVENTION

An object of the present invention is a new method for the acquisition of software programs by microcomputers.

In the invention, it is proposed to use an information retrieval center or data base service center in which there will be stored applications software programs to be distributed and a removable electronic memory carrier containing rights of access to software to enable the remote loading of application software programs into a microcomputer.

Indeed, most microcomputers contain or may contain cards having functions of communication between the microcomputer and the exterior. These cards are called input/output function cards. A typical example of these is the modem which is connected by a first connector to the microcomputer and by a second connector to a telephone line for the dispatching or reception of digital data by the line. In another example of a card with a communications function, the communication with the exterior is achieved not by a connector with physical contacts but by RF links. These cards may be connected to an input/output port of the microcomputer or directly mounted inside the microcomputer.

According to the invention, application software programs are loaded into the data base service center to which microcomputers may be connected by a card such as this with input/output functions. Removable memory carriers having very little memory are delivered (sold) to the users. These carriers contain a right of access to at least one application software program. In this case, a carrier such as this comprising practically no memory has a low cost of about twenty francs at most. The information elements stored use only some bytes. The carrier may be, for example, a credit card type of chip card or again a PCMCIA card with very limited memory, and the microcomputer have the drives that correspond to these cards.

When a user of a microcomputer wishes to acquire an application software program, he purchases the carrier that contains the right of access to this software program. The price of the carrier corresponds to the sales price of the software plus that of the carrier which does not exceed about twenty francs. The user then inserts the carrier into the drive of the microcomputer. He sets up connection with the data base service center and selects the desired application software program, for example through the screen and keyboard of the microcomputer. The service center will then check the right of access in the carrier, through the microcomputer, and then transfer the application software program to the microcomputer, for example into its internal memory.

More specifically, the software acquisition method according to the invention comprises chiefly the following steps:

in a first step, software programs are loaded into a data base service center to which it is possible to connect microcomputers capable of receiving removable memory carriers and users of microcomputers are given a removable electronic memory carrier containing at least one right of access to a software program of the data base service center;

in a second step, a user of a microcomputer introduces the removable electronic memory carrier in his possession and a desired software program from the service center, authorized by the carrier, is remote-loaded into the microcomputer.

In one example, the software is remote-loaded into the internal memory. It can also be remote-loaded into a PCMCIA card when the microcomputer has a sufficient number of drives.

The time taken to remote-load the software depends only on the size of the software program and the transmission characteristics (format, bit rate etc.) of the microcomputer/service center link (which may be a modem link, wireless network etc.).

According to another characteristic of the invention, the right of access is controlled by the service center through the use of safety procedures with identification and enciphering/deciphering algorithms. The memory carrier comprises, to this end, an electronic safety module that makes it tamper-proof. For, fraudulent persons have to be prevented from pirating information contained in the carriers: this would enable them to remote-load software without having to pay for them, by making pirated versions of carriers.

The term electronic safety module is understood here to mean an integrated circuit chip comprising a non-volatile memory with confidential information and a programmed security circuitry capable of using this confidential information and other information elements given by the user to deliver validation instructions, after the verification of a predetermined relationship between these two types of information. The confidential data elements do not go out of the module.

According to another aspect of the invention, the very use of the application software programs is made secure. The method then comprises chiefly the following steps:

the user is given a removable memory carrier containing rights of use proper at least to one software program of the service center and permitting the remote-loading of the corresponding software program or programs;

the user must then introduce the memory carrier containing the rights of use proper to the software program that he wishes to remote-load and that he seeks to run. The remote-loaded software program is advantageously self-protected, and its running includes interrogations to the memory carrier to make checks on the secret rights of use and permit or prohibit the running of the rest of the program.

BRIEF DESCRIPTION OF THE DRAWING

Other features and advantages of the invention shall appear from the following description, made by way of a indication that does not restrict the scope of the invention, with reference to the appended drawing, referenced FIG. 1, which is a drawing of a data-processing system according to the invention;

MORE DETAILED DESCRIPTION

Figure 1:
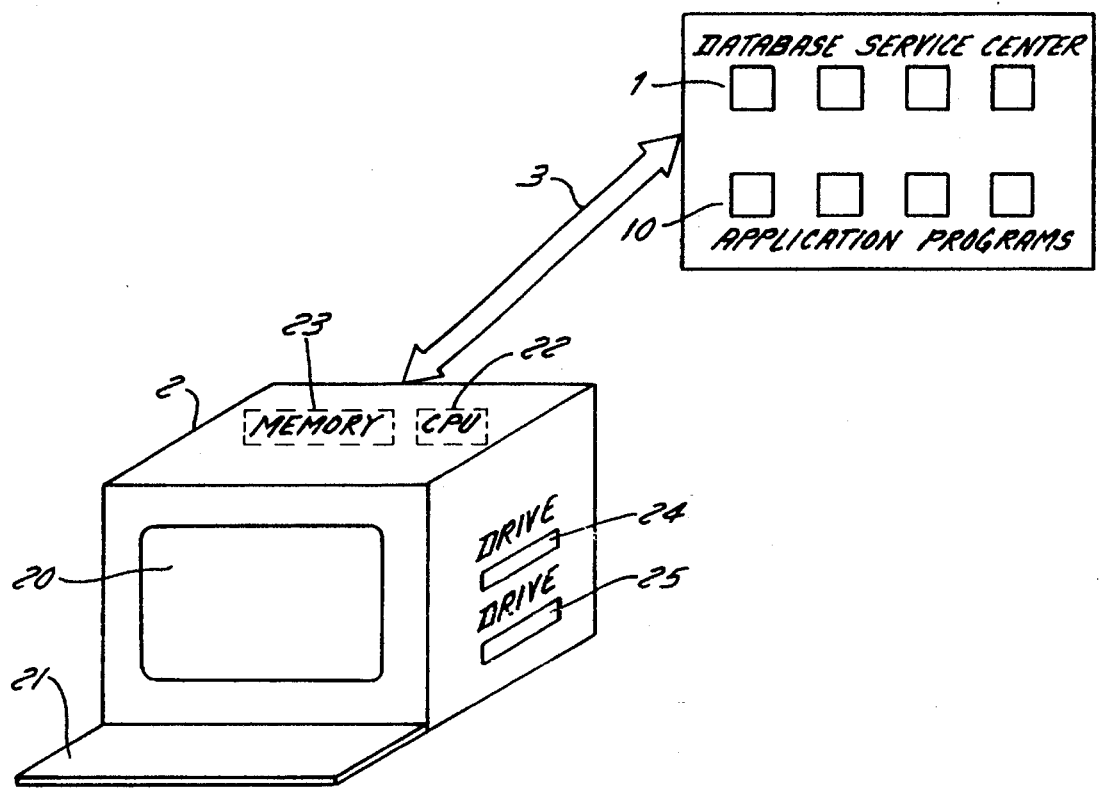
Figure 1:
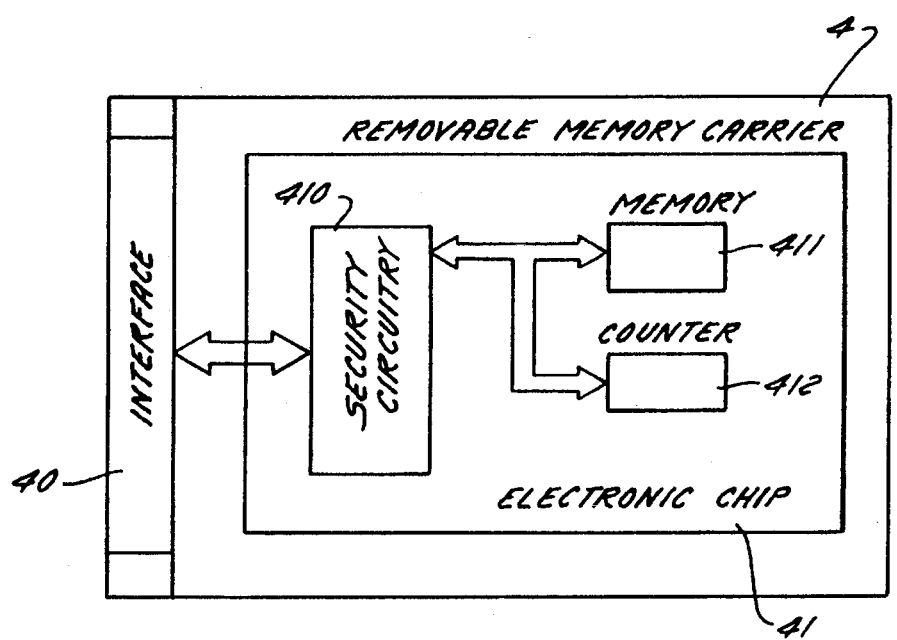

A data-processing system according to the invention is shown in FIG. 1. It comprises a data base service center 1 in which there are stored application software programs 10, a microcomputer 2 connected to the service center by an interface 3 (such as a telephone network, radiophone network etc.) and a removable electronic memory carrier 4.

The microcomputer comprises: a screen 20, a keyboard 21 which may be replaced by a light pencil or any other existing man/machine interface, a central processing unit 22, an internal memory 23 and a drive 24 for the reading of removable electronic memory carriers.

The memory carrier comprises an interface 40 for connection to the drive 24 of the microcomputer, a non-volatile memory electronic chip 41. In the memory 41, the memory carrier contains secret information elements corresponding to a right of access to one or more application software programs stored in the server 1. These carriers are, in practice, marketed by the vendor/distributor of the application software programs considered.

To carry out the acquisition of an application software program, the user who possesses a carrier containing the corresponding right of access must introduce it into the the drive 24 of the microcomputer. Then, the user starts running a connection software program on the microcomputer. When communication is set up with the service center, this service center displays a menu on the screen of the microcomputer.

Through this menu, the user chooses the application software program(s) that he wishes to acquire. The service center will then check the right of access to these software programs by interrogating the carrier through the central processing unit of the microcomputer. This check is advantageously made by using security methods similar to those used in chip cards (credit cards), i.e. with identification and authentication procedures, using enciphering and deciphering algorithms. The secret information elements are not sent out of the carrier. The non-volatile memory electronic chip 41 then comprises a security circuitry programmed to carry out these security functions.

If the safety check is positive, the service center carries out the remote-loading of the application software program(s) selected and authorized by the carrier in the internal memory of the microcomputer. As an option, for a microcomputer comprising at least two drives 24 and 25 for the reading of removable electronic memory carriers, provision may be made to enable the user to choose the place where the software has to be remote-loaded: whether in an internal memory 23 of the microcomputer or on a removable carrier 5 comprising an electronic chip 50 of a random-access memory, for example. The remote-loaded software can then be run by the microcomputer.

Now, it is possible to imagine a case where a fraudulent person has been able to memorize the software at the time of the remote-loading. But advantageously, to protect the method of the invention, there is provision for a removable electronic memory carrier to be introduced into the drive during the running of the application software, said carrier containing secret data elements corresponding to known rights of use of the software program. This program, when it is being run, interrogates the memory carrier from time to time in order to ascertain that the rights of use are present. This check will be done preferably by using known security methods, notably the enciphering/deciphering algorithms. The memory carrier contains a security chip for this purpose.

Advantageously, the same memory carrier 4 contains rights of access to an applications software and the corresponding rights of use in the same electronic chip 41.

Other options may be envisaged. For example, it may provided that the application software program is sold for a limited number of uses. The electronic chip will then include, for example, a counter containing this information element. One task of the application software program will comprise, for example, the following steps:

reading, on the removable memory carrier 4, an information element indicating whether the software has been acquired for a limited number of uses. If the answer is "no", this task is ended and the running of the program continues;

if the answer is "yes", then a decrementation command is sent. The electronic chip makes an internal check on the contents of the counter and if the value of the contents is not zero it sends an acknowledgment to the microcomputers. The software program can continue to run;

but if the value of the counter is zero, then it sends back an error message for example, and the running of the software program is stopped.

In a practical example of an application, the removable memory carrier 4 is a chip card, or a PCMCIA card containing only the electronic chip needed for the application. The microcomputer will be fitted out with the corresponding drives to read cards such as these. The electronic chip 41 will comprise, for example, a programmed security circuitry 410, a non-volatile memory circuitry 411 and a counter 412.

The security circuitry 410 monitors the access to the memory and to the counter, and manages the external access to the carrier.

What is claimed is:

1. A method for the acquisition of software programs from a database service center by a computer, the method comprising the steps of:

loading a plurality of software programs into the data base service center;

providing a user of a microcomputer with a first removable electronic memory carrier containing a right of access to a specific subset of the plurality of software programs of the database service center, the first memory carrier having insufficient capacity to store the specific subset of the plurality of software programs;

providing the user of the microcomputer with a right of use proper to the specific subset of the plurality of software programs, the right of use being provided on a second removable electronic memory carrier;

introducing the first memory carrier into a first memory carrier drive of the microcomputer;

remote-loading the specific subset of the plurality of software programs from the service center into the microcomputer, the remote-loading being authorized based on the right of access contained in the first memory carrier provided to the user;

introducing the second memory carrier into a second memory carrier drive of the microcomputer;

executing the specific subset of the plurality of software programs, the executing step being performed by the microcomputer; and interrogating the memory carrier to check the right of use, and permitting or prohibiting continued execution of the specific subset of the plurality of software programs based on the interrogating step.

2. A method for the acquisition of software programs according to claim 1, wherein the remote-loading step further comprises the steps of:

setting up communication between the microcomputer and the service center;

selecting the specific subset of the plurality of software programs to be remote-loaded; and ascertaining that the first memory carrier contains a corresponding right of access to permit the transfer of the specific subset of the plurality of software programs to the microcomputer.

3. A method for the acquisition of software programs according to claim 1, wherein the second memory carrier comprises a counter indicating the number of uses of the specific subset of the plurality of software programs that are still authorized, and wherein executing step results in a decrementation of the counter and in a checking, by the carrier, of the state of the counter for permitting or prohibiting continued execution of the specific subset of the plurality of software programs.

4. A method for the acquisition of software programs from a database service center by a computer, the method comprising the steps of:

loading a plurality of software programs into the data base service center;

providing a user of a microcomputer with a removable electronic memory carrier containing a right of access to a specific subset of the plurality of software programs of the database service center, the removable electronic memory carrier having insufficient capacity to store the specific subset of the plurality of software programs;

providing the user of the microcomputer with a right of use proper to the specific subset of the plurality of software programs, the right of use being provided on the memory carrier;

introducing the memory carrier containing the right of access and right of use into a memory carrier drive of the microcomputer;

remote-loading the specific subset of the plurality of software programs from the service center into the microcomputer, the remote-loading being authorized based on the right of access contained in the memory carrier provided to the user;

executing the specific subset of the plurality of software programs, the executing step being performed by the microcomputer; and interrogating the memory carrier to check the right of use, and permitting or prohibiting continued execution of the specific subset of the plurality of software programs based on the interrogating step.

5. A method for the acquisition of software programs according to claim 4, wherein the memory carrier comprises a counter indicating the number of uses of the remote-loaded software program that are still authorized, and wherein the executing step results in a decrementation of the counter and in a checking, by the carrier, of the state of the counter for permitting or prohibiting continued execution of the specific subset of the plurality of software programs.

6. A method for the acquisition of software programs according to claim 4, wherein the verification of the data elements stored in the memory carrier uses procedures of authentication and enciphering/deciphering, the memory carrier comprising, to this end, an electronic security module providing for security against access to the data elements memorized in the carrier.

7. A method for the acquisition of software programs according to claim 4, wherein the remote-loading step further comprises the step of loading the specific subset of the plurality of software programs into one of internal memory of the microcomputer and a second memory carrier comprising sufficient memory.

8. A method for the acquisition of software programs according to claim 4, wherein the storage capacity of the memory carrier is in the range of bytes.

9. A data processing system for downloading a specific subset of a plurality of programs from a data base service center to a microcomputer means, the system comprising the data base service center having the plurality of software programs stored therein;

the microcomputer means capable of setting up communication with the data base service center, the microcomputer means further comprising memory carrier drive means and a memory means, the memory means having sufficient capacity to store the specific subset of the plurality of software programs, and the microcomputer means defining means for executing the specific subset of the plurality of software programs after the specific subset has been downloaded and stored in the memory means;

means for enabling the accessing of the specific subset of the plurality of software programs loaded into the data base service center by the microcomputer means, the enabling means comprising a removable memory carrier containing a right of access to the specific subset of the plurality of software programs, the right of access permitting the downloading the specific subset of the plurality of software programs into the microcomputer means, the enabling means being introduced into the memory carrier drive means of the microcomputer, and the access enabling means having insufficient capacity to store the specific subset of the plurality of software programs; and a means for enabling the execution of the specific subset of the plurality of software programs, the execution enabling means further comprising a right of use, the right of use permitting the microcomputer means to execute the specific subset of the plurality of software programs after the specific subset has been remote loaded into the memory means.

10. A data-processing system according to claim 9, wherein the removable memory carrier is a PCMCIA card.

11. A data-processing system according to claim 9, wherein the removable memory carrier is a protected chip card.

12. A software distribution system comprising:

a data base service center, the data base service center having a plurality of software programs stored therein;

an interface; and a microcomputer, the microcomputer being connected to the data base service center by the interface, the microcomputer further including a memory device, the memory device having capacity sufficient to store the specific subset of the plurality of software programs stored in the data base service center, a first removable electronic memory carrier, the first memory carrier containing a right of access to the specific subset of the plurality of software programs, the right of access permitting the microcomputer to remote load the specific subset of the plurality of software programs into the memory device, and the first memory carrier having insufficient capacity to store the specific subset of the plurality of software programs, a second memory carrier, the second memory carrier further comprising a right of use, the right of use permitting the microcomputer to execute the specific subset of the plurality of software programs after the specific subset of the plurality of software programs has been remote loaded into the microcomputer memory device;

a first memory carrier drive, the first memory carrier drive receiving the first memory carrier in the microcomputer, and a microprocessor, the microprocessor executing the specific subset of the plurality of software programs, the specific subset being loaded into the microprocessor from the memory device.

13. The software distribution system as in claim 12, wherein the second memory carrier further comprises a counter, the counter decrementing each time the specific subset of the plurality of software programs is executed, and the memory carrier checking the state of the counter to permit or deny the execution of the specific subset of the plurality of software programs.

14. A software distribution system comprising:

a data base service center, the data base service center having a plurality of software programs stored therein;

an interface; and a microcomputer, the microcomputer being connected to the data base service center by the interface, the microcomputer further including a memory device, the memory device having capacity sufficient to store the specific subset of the plurality of software programs stored in the data base service center, a removable electronic memory carrier, the memory carrier comprising a right of access to the specific subset of the plurality of software programs, the right of access permitting the microcomputer to remote load the specific subset of the plurality of software programs into the memory device, a right of use, the right of use permitting the microcomputer to execute the specific subset of the plurality of software programs after the specific subset has been remote loaded into the microcomputer memory device, and wherein the memory carrier has insufficient capacity to store the specific subset of the plurality of software programs, a memory carrier drive, the memory carrier drive receiving the memory carrier in the microcomputer, and a microprocessor, the microprocessor executing the specific subset of the plurality of software programs, the specific subset being loaded into the microprocessor from the memory device.

15. A software distribution system as in claim 14, wherein the memory device comprises internal memory of the microcomputer.

16. A software distribution system as in claim 14, wherein the microcomputer comprises a second removable electronic memory carrier, the second memory carrier being received in the microcomputer by a second memory carrier drive.

17. The software distribution system as in claim 14, wherein the memory carrier further comprises a counter, the counter decrementing each time the specific subset of the plurality of software programs is executed, and the memory carrier checking the state of the counter to permit or deny the execution of the specific subset of the plurality of software programs.

18. The software distribution system as in claim 14, wherein the memory carrier further comprises an electronic security module providing for security against access to data elements stored in the memory carrier.

19. A software distribution system as in claim 14, wherein the storage capacity of the memory carrier is in the range of bytes.

20. The software distribution system as in claim 14, wherein the memory carrier is a protected chip card.

* * * * *